April 13, 1948.                L. S. WILLIAMS                2,439,533
                          HYDRAULIC WEIGHING SCALE
                           Filed Sept. 6, 1944           3 Sheets-Sheet 2
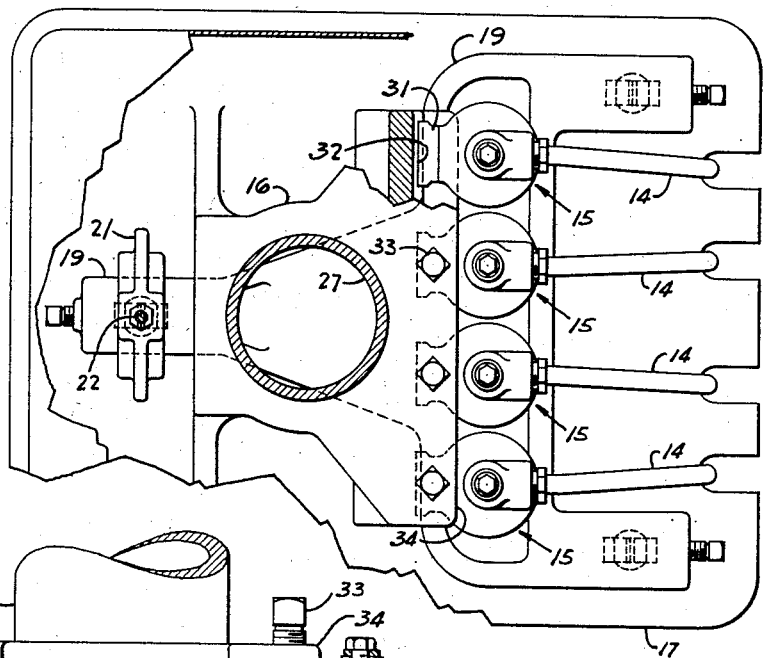
Fig. II
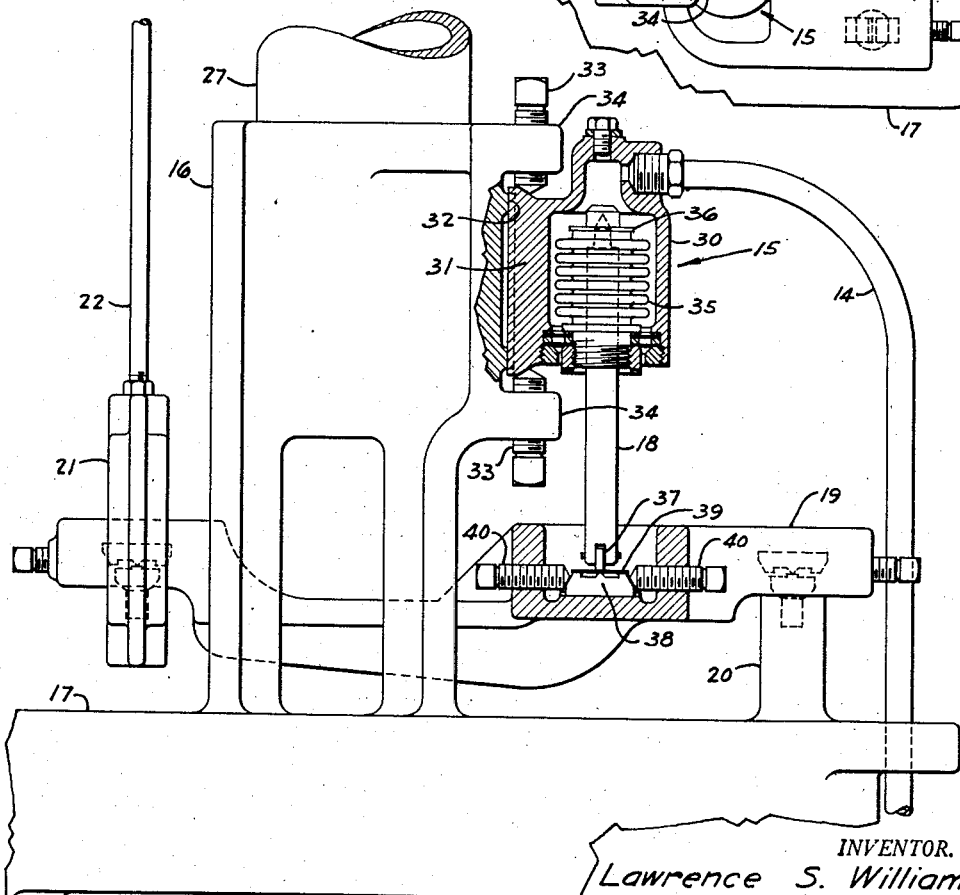
Fig. III
INVENTOR.
Lawrence S. Williams
BY
Marshall & Marshall
ATTORNEYS

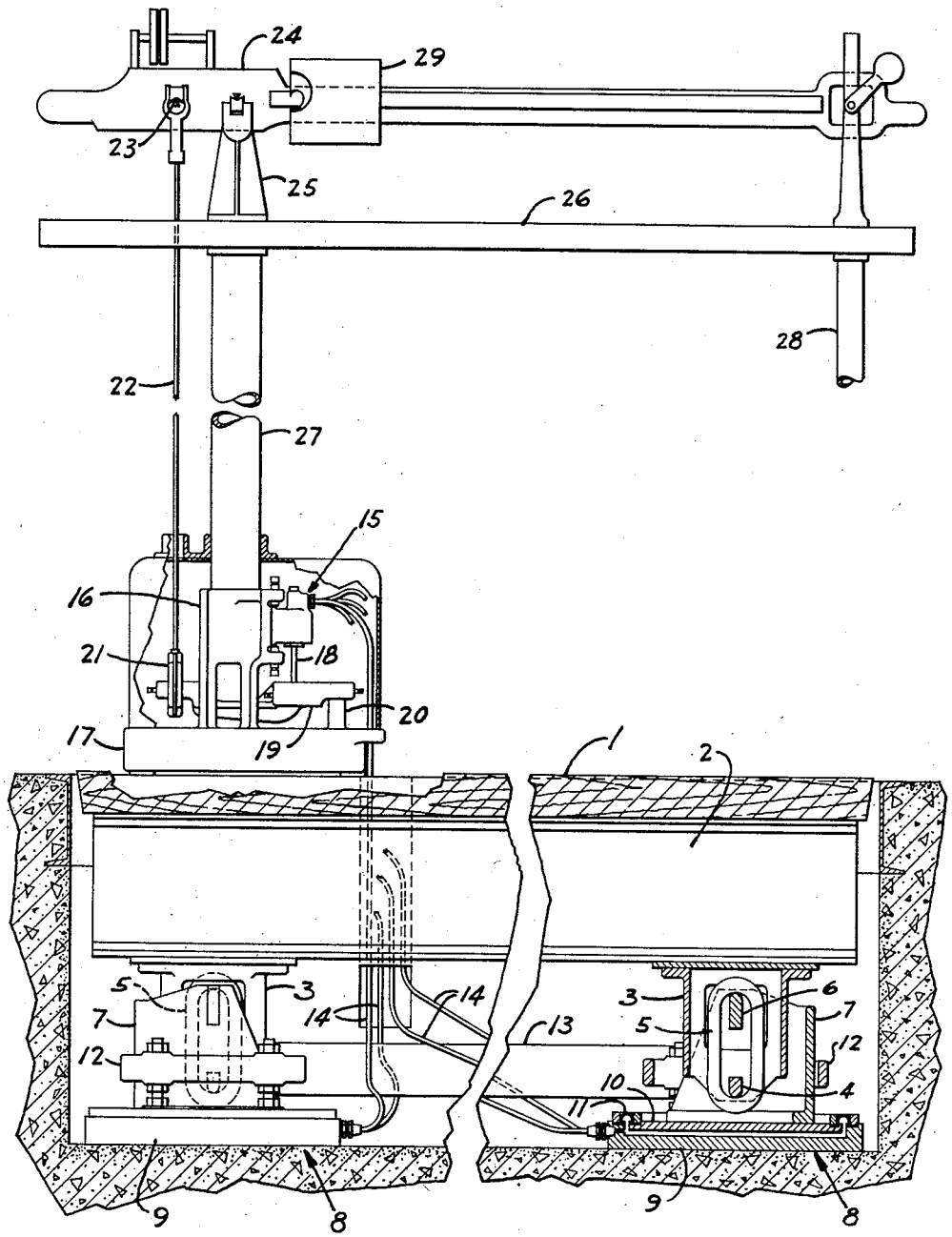
Fig. I

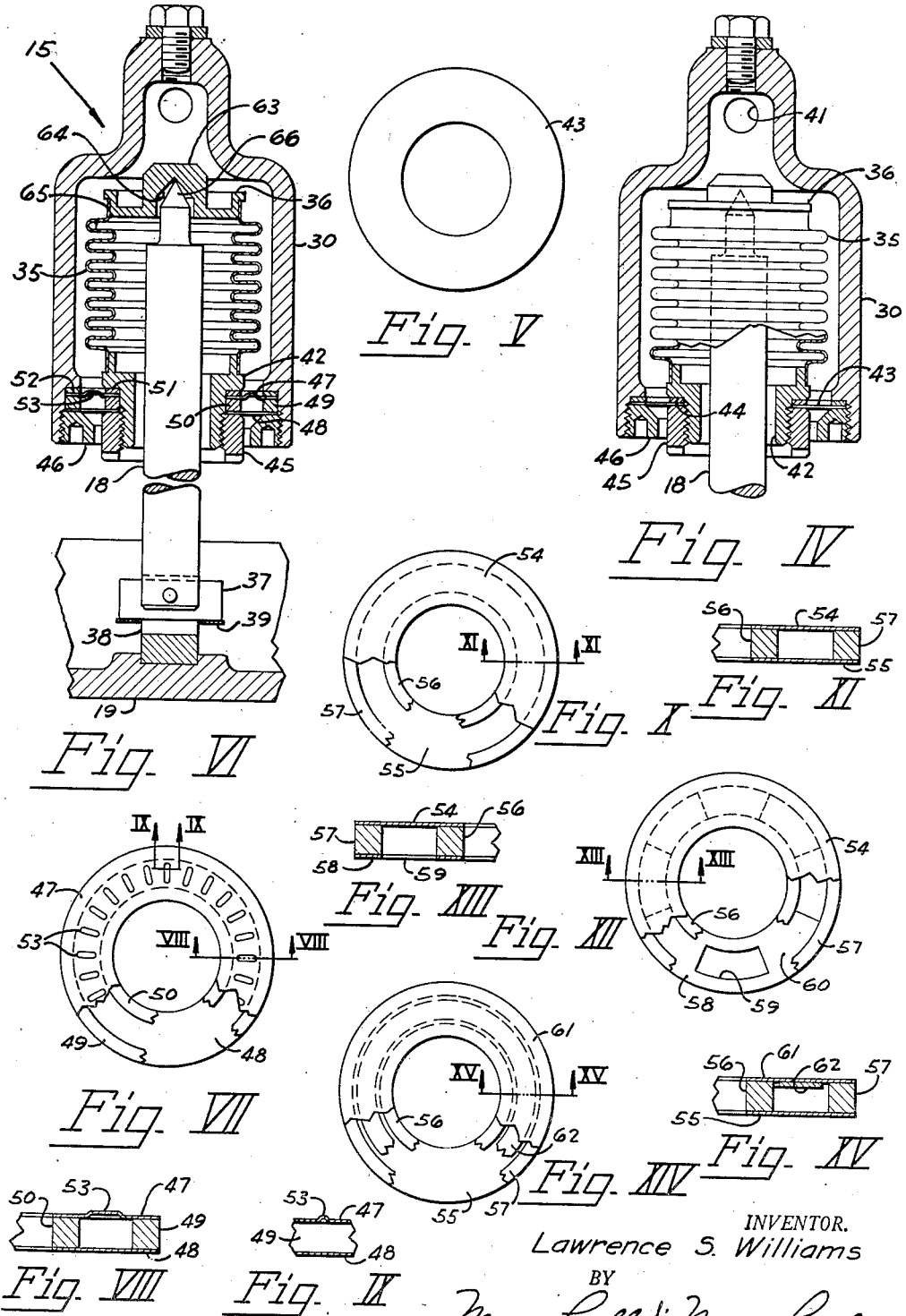

Patented Apr. 13, 1948

2,439,533

UNITED STATES PATENT OFFICE 2,439,533

HYDRAULIC WEIGHING SCALE

Lawrence S. Williams, Toledo, Ohio, assignor to Toledo Scale Company, Toledo, Ohio, a corporation of New Jersey Application September 6, 1944, Serial No. 552,865

7 Claims. (Cl. 265—47)

This invention relates to force transmission mechanism and in particular to a device for precisely translating hydraulic pressure into mechanical force. The force translating mechanism embodying the invention is primarily designed for use in the receiving end of a hydraulic scale system and serves to translate hydraulic pressure produced by loads on a load receiver into mechanical force which is counterbalanced and indicated by weighing mechanism.

In the construction of hydraulic weighing scales of high accuracy, it was found that the bellows used at the receiving end of the hydraulic system was responsible for a large portion of the errors observed. From an analysis of the errors it appears that the effective area of the bellows varies with the magnitude of the load or force being translated. The apparent variations in effective area, instead of being proportional to the force being transmitted, are greater during the application of the first part of the load than they are during the application of the remainder of the load. It is thus impossible to correct for these variations by changes in lever ratio or poise weight.

The object of this invention is to provide a simple mounting for a bellows used in a force translating system which inherently compensates for the error introduced by the bellows.

Another object of the invention is to provide means which, while allowing deflection of a bellows mounting along the axis of the bellows, prevents any twisting or angular movement of the bellows mounting.

A still further object is to provide a freely rockable connection between a bellows sealing member and a strut which transmits force thereto.

These and other objects and advantages are attained in the examples shown in the drawings which illustrate preferred embodiments of the invention.

In the drawings:

Figure I is an elevation, partly in section with some parts broken away, of a hydraulic weighing scale embodying the invention.

Figure II is a fragmentary plan of the receiving end of the hydraulic system of the weighing scale shown in Figure I.

Figure III is a side view, partly in section, of the receiving end of the hydraulic system.

Figure IV is a greatly enlarged sectional view of a pressure receiving unit embodying a form of the invention.

Figure V is a plan view of a diaphragm used for supporting the lower end of the bellows of the pressure receiving unit shown in Figure IV.

Figure VI is a vertical section of one of the pressure receiving units of the receiving system shown in Figure III.

Figure VII is a plan view of a diaphragm assembly used in the pressure receiving unit shown in Figure VI.

Figure VIII is a fragmentary vertical section taken along the line VIII—VIII of Figure VII.

Figure IX is a fragmentary vertical section taken along the line IX—IX of Figure VII.

Figure X is a plan view with parts broken away showing an alternative form of diaphragm for supporting the pressure receiving bellows.

Figure XI is a fragmentary vertical section taken along the line XI—XI of Figure X.

Figure XII is a plan view with parts broken away showing still another form of diaphragm assembly.

Figure XIII is a fragmentary vertical section taken along the line XIII—XIII of Figure XII.

Figure XIV is a plan view with parts broken away showing still another form of diaphragm assembly.

Figure XV is a fragmentary vertical section taken along the line XV—XV of Figure XIV.

These specific drawings and the accompanying description disclose a preferred embodiment of the invention and are not intended as a limitation of the claims.

Fundamentally, the invention consists in resiliently mounting one end of a bellows used in a hydraulic force transmission system so that the deformation of the mounting under load will produce a mechanical deformation of the bellows in such direction and magnitude that the elastic forces generated in the bellows thereby will compensate for changes in effective area of the bellows. It has been found that when a bellows is installed in a cup-shaped housing and hydraulic fluid is admitted to the space between the housing and the bellows, thus tending to compress the bellows, the effective area of the bellows decreases at a decreasing rate with increase in hydraulic pressure. When such a structure is used in a weighing scale the apparent area change causes the scale to be slow at half capacity, i. e. indicate less than the actual load, when it is adjusted to indicate correctly at full load. By providing a resilient mounting between the bellows and the cup-shaped housing, the deformation of the mounting tends to stretch the bellows and thus aid in transmitting force to the lever system. By employing an annular diaphragm as the resilient member a nonlinear force-deflection ratio is obtained, the nonlinearity being in such direction as to correctly compensate for the error inherent in the bellows.

A complete hydraulic scale comprises a rectangular load receiving deck 1 supported on longitudinally extending girders 2. At each corner of the deck 1 the girders 2 are supported on a depending bracket 3 the bottom of which is provided with a horizontal crossbar 4 engaging a link 5 suspended from a crossbar 6 spanning the space between the sides of an open-ended box-like member 7. The box-like member 7 is supported by a hydraulic capsule 8 comprising a recessed base member 9 and an upper plate 10. The space between the recessed member 9 and the upper member 10 is filled with a hydraulic fluid, the hydraulic fluid being retained by a flexible yet nonstretchable diaphragm 11. The box-like member 7 and the upper plate 10 of the capsule 8 are prevented from tipping by stabilizer rings 12 surrounding the box-like members 7 and bolted to the upper plates 10. The rings 12, one for each of the capsules supporting the load receiver, are joined by an H-shaped pipe and I-beam framework 13 which, while not designed to carry any of the load on the deck, serves to hold the upper plates 10 of the capsules 8 in perfect alignment. Horizontal oscillation of the deck 1 in response to movements of loads is permitted by the swinging action of the links 5 without producing any deformation of the hydraulic capsules 8.

Loads placed on the deck 1 are supported by hydraulic pressure in the capsules 8. The hydraulic pressure from each of the capsules is transmitted through one of a series of tubes 14 to a pressure receiving unit 15 mounted on a pedestal 16 erected from a base 17. A series of struts 18 extending upwardly into the pressure receiving units 15 transmit force to a lever 19 fulcrumed on stands 20 erected from the base 17. The lever 19 extends between spaced apart legs of the pedestal 16 and at its far end is pivotally engaged by a stirrup 21 depending from a steelyard rod 22 supported from a load pivot 23 of a weigh beam 24. The weigh beam 24 is fulcrumed on a fulcrum stand 25 erected from a weigh beam shelf 26 which in turn is supported on pipe stands 27 and 28. A poise 29 slidably mounted on the weigh beam 24 serves to counterbalance loads applied through the steelyard rod 22.

As shown in Figure II, the lever 19, substantially in the form of an A, has fulcrum pivots at the end of its legs and a power pivot at its apex. The pressure receiving units 15, one for each of the four capsules 8, are disposed in a row above the crossbar of the A. In this arrangement the mechanical forces produced by the hydraulic transmission systems are added together by the lever 19.

Referring to Figure III, hydraulic pressure from the capsule is transmitted through the tube 14 to the interior of a cup-shaped housing 30 constituting the stationary part of the pressure receiving unit 15. The housing 30 has a flange 31 extending longitudinally along one side. The ends of the flange 31 are flared outwardly so that when the housing 30 is mounted on the pedestal 16 with the sides of the flange 31 contacting vertical machined surfaces 32 of the pedestal 16 a pair of cone pointed screws 33 threaded through horizontal flanges 34 of the pedestal 16 may engage and adjustably lock the flange 31 in position. A bellows 35 is mounted within each of the cup-shaped housings 30 and at its upper end is sealed by a bellows cap 36. The associated strut 18 engages the lower surface of the bellows cap 36 and serves to transmit force from the bellows cap to a bearing 37 resting on the knife edge of a knife edge block 38. The bearing 37 is retained in place on the knife edge block 38 by means of an annular flexure plate 39 which is attached to the bearing 37 at points in line with the knife edge and to the knife edge block 38 at points remote from the line of the knife edge. The knife edge blocks 38 are mounted in a row in the lever 19 and are each individually adjustable to vary the respective pivot distances. This adjustment, which is made by a selective tightening of a pair of cone pointed screws 40 contacting the ends of the knife edge block 38, is used to adjust the overall force transmission ratio from each corner of the scale and thus secure correct weighing of loads regardless of their position on the scale.

Referring to Figure IV, the bellows 35 substantially fills the space within the cup-shaped housing 30. Hydraulic fluid entering the housing through an opening 41 from one of the tubes 14 fills the space between the bellows and the housing. The lower end of the bellows 35 is sealed to a sealing ring 42. The inner edge of an annular diaphragm 43 is clamped against a shoulder 44 of the sealing ring 42 by a clamp ring 45 threaded onto the lower portion of the sealing ring 42. The outer edge of the annular diaphragm 43 is clamped into the bottom of the housing 30 by a threaded locking ring 46.

When hydraulic pressure is applied in the space between the housing 30 and the bellows 35, it acts downwardly on the top of the bellows sealing cap 36 and that force is transmitted through the strut 18 to the counterbalancing lever system. The pressure also acts on the sides of the bellows and between its folds. The effect of the pressure applied to the bellows appears to be a slight reduction in effective cross-sectional area of the bellows thus causing the translation ratio between hydraulic pressure and mechanical force to change with load.

The bellows 35 is made of a metallic elastic material and acts as a spring in resisting any deformation. Thus, if the lower end of the bellows is pulled downwardly as hydraulic load is applied, an additional force is transmitted to the strut 18 which may be used to compensate for the apparent decrease in cross-sectional area. The hydraulic pressure acting against the diaphragm 43, which in itself is a nonlinear elastic member, slightly deflects the diaphragm and thus stretches the bellows to cause the spring effect of the bellows to supplement the force transmission of the hydraulic pressure acting against the bellows cap 36. By suitably proportioning the area, the thickness and the elastic modulus of the annular diaphragm, it can be made to nonlinearly stretch the bellows and thus completely compensate for the nonlinear change in apparent effective area.

The amount of stretching required to effect compensation is slight. In order to secure effective compensation the annular diaphragm 43 and the bellows sealing ring 42 must not be allowed to twist or rock about a horizontal axis. Such rocking, by introducing other forces into the diaphragm 43, produces greater errors than those which the diaphragm is designed to remove. Therefore, in the practical form of pressure receiving unit used in the scale shown in Figure I and, in detail in Figure VI, the diaphragm comprises upper and lower members 47 and 48 which together act as a parallelogram to ensure pure axial motion of the bellows sealing ring 42. In the construction of the composite diaphragms formed of the annular diaphragms 47 and 48, the individual diaphragms are spot welded to a pair of spacing members 49 and 50. It is not necessary that they be continuously welded inasmuch as a liquid tight seal is not required between the diaphragms and the spacing rings. Hydraulic fluid is prevented from escaping past the diaphragms by a pair of gaskets 51 and 52. The welding, however, prevents any radial slipping of the diaphragms 47 and 48 when load is applied. If such slipping were allowed, it would introduce friction into the weighing and would show up as a difference in weighing as loads are applied or removed.

It is also desirable, to secure the best force-deflection curve to prevent the diaphragm 47, which is exposed to the hydraulic fluid, from taking on a curved dished appearance as the pressure is increased. It is desirable that the flexure in the diaphragm occur near its supported edges and that when deflected it forms a very shallow cone. The diaphragm may be stiffened by providing short radial dimples 53. These dimples serve to stiffen the unsupported portion of the annular diaphragm 47 without materially increasing its resistance to deflection of the bellows sealing ring 42.

It is possible to secure very nearly correct compensation of the bellows error without providing the dimples 53. Thus, the diaphragm assembly shown in Figure X, which comprises an upper flat annular diaphragm 54, a lower diaphragm 55 and spacing rings 56 and 57, may be substituted for the composite diaphragm having the dimples without materially changing the operation or the accuracy of translation of the hydraulic pressure to mechanical force.

It may be found with available diaphragm materials that the flat diaphragms 54 and 55 are too stiff and insufficient compensation is obtained. If this occurs, a perforated diaphragm 58 may be substituted for the lower diapragm 55. The diaphragm 58 has a series of arcuate holes 59 cut through it leaving radial spoke-like portions 60 which serve to guide the bellows sealing ring 42 but which do not offer material resistance to axial motion. It is also immaterial, except for sealing in the hydraulic fluid, whether the diaphragm 58 is installed as the upper or the lower diaphragm in the assembly. If it is installed as the upper diaphragm, the hydraulic fluid, of course, fills the space between the diaphragms and suitable gaskets must then be used below the diaphragms to prevent the escape of the fluid.

If, on the other hand, it is found that the diaphragm assembly, shown in Figure X, allows too much deflection of the bellows ring 42, the upper diaphragm 54 may be replaced by a reinforced diaphragm 61. The diaphragm 61 has an annular plate 62 welded to its lower surface. The annular plate 62 extends radially nearly the full distance between the spacing rings 56 and 57 to which the upper and lower diaphragms are welded. Sufficient radial space is allowed between the spacing rings 56 and 57 and the annular plate 62 to allow the diaphragm 61 to bend under the influence of the hydraulic pressure.

These are representative of a number of ways in which a bellows may be resiliently mounted so that it is mechanically stretched in accordance with the hydraulic pressure. In a co-pending application Ser. No. 523,669 (now Patent No. 2,379,207) a similar result is obtained by installing an internally stressed bellows in the strut 18, the internally stressed bellows acting to lengthen the strut 18 in proportion to hydraulic pressure, thus in effect, stretching the bellows. The diaphragm assemblies, disclosed in this application, accomplish the same result by moving the normally rigidly supported end of the bellows.

In the interest of securing the greatest accuracy from the bellows, it is desirable that the top of the bellows, the end sealed by the cap 36, be free to assume whatever position it will. In order to allow it substantially frictionless freedom and yet retain stability, the bellows cap 36 is made with a central boss 63 extending considerably higher than the point of attachment of the bellows 35. The interior of the boss 63 is bored, the end of the bore terminating in a conical recess 64. The vertex of this conical recess lies on the axis of a cylindrical surface 65 to which the bellows is attached. The vertex, however, is disposed in a plane above the surface 65 such that when hydraulic pressure acts downwardly on the cap 36 it will, in effect, hang suspended on a rounded conical point 66 of the strut 18. Inasmuch as the bellows attempts to contract under the influence of hydraulic pressure, it acts an a tension link pivotally connected to the strut 18 and the housing 30. The strut 18 is much longer in length, therefore, any side deflection or tendency to tip of the bellows immediately produces a restoring force tending to return the bellows and strut to their midposition. Thus, although the strut 18 is pivoted at each end and the bellows 35 is resilient, a stable structure is obtained because the application of hydraulic pressure tends to force these elements into their correct positions. If the upper end of the bellows is restrained by making a rigid connection between the bellows cap and the strut, the effect of small irregularities or inaccuracies in the bellows will be magnified and show up as errors in the scale indication. The pivoted connection, by allowing the bellows to freely move equalizes these inaccuracies and thus produces an accurate frictionless translation of hydraulic pressure to mechanical force.

Having described the invention, I claim:

1. In a device of the class described, in combination, a housing having a recess connected to a source of hydraulic pressure, an elastic bellows mounted in said recess, means for sealing the inner end of the bellows and transmitting force from said bellows, and a resilient mounting for supporting said bellows and sealing the space between said bellows and the mouth of said recess, said resilient means comprising a pair of spaced annular diaphragms, one of which is subjected to hydraulic pressure.

2. In a device of the class described, in combination, a housing having a recess connected to a source of hydraulic pressure, an elastic bellows mounted in said recess, means for sealing the inner end of the bellows and transmitting force from said bellows, and a resilient mounting for supporting said bellows and sealing the space between said bellows and the mouth of said recess, said resilient means comprising a pair of spaced annular diaphragms, one of which is subjected to hydraulic pressure and has means for preventing bulging under the influence of pressure.

3. In a device of the class described, in combination, a housing having a recess connected to a source of hydraulic pressure, an elastic bellows mounted in said recess, means for sealing the inner end of the bellows and transmitting force from said bellows, and a resilient mounting for supporting said bellows and sealing the space between said bellows and the mouth of said recess, said resilient means comprising a pair of spaced annular diaphragms, one of which is subjected to hydraulic pressure and the other of which is perforated to reduce its axial stiffness without decreasing its radial stiffness.

4. In a device of the class described, in combination, a housing having a recess connected to a source of hydraulic pressure, an elastic bellows mounted in said recess, means for sealing the inner end of the bellows and transmitting force from said bellows, and a resilient mounting for supporting said bellows and sealing the space between said bellows and the mouth of said recess, said resilient means comprising a pair of spaced annular diaphragms, one of which is subjected to hydraulic pressure and is reinforced by a thin metallic annular plate to resist curved deformation.

5. In a device of the class described, in combination, a housing having a recess connected to a source of hydraulic pressure, an elastic bellows mounted in said recess, means for sealing the inner end of the bellows and transmitting force from said bellows, and a resilient mounting for supporting said bellows and sealing the space between said bellows and the mouth of said recess, said resilient means comprising a pair of spaced annular diaphragms, one of which is subjected to hydraulic pressure and is provided with a plurality of radial dimples to resist curved deformation.

6. In a device of the class described, in combination, a hydraulic capsule serving as a support for a load receiver, a housing having a recess therein, a hydraulic connection between the capsule and the recess, a bellows contained in the recess, a resilient annular diaphragm fixed in the mouth of the recess and sealed to the adjacent end of the bellows, means for sealing the other end of the bellows and transmitting force therefrom, guiding means engaging the adjacent end of the bellows for maintaining the end of the bellows when deflected in parallelism with its non-deflected position, said diaphragm having a pressure deflection characteristic that permits movement of the attached end of the bellows to correct errors in force translation of the bellows and capsule.

7. In a device of the class described, in combination, a housing having a recess therein, a hydraulic connection between a source of hydraulic pressure and the recess, a bellows contained in the recess, a resilient annular diaphragm fixed in the mouth of the recess and supporting the adjacent end of the bellows, means for sealing the other end of the bellows and transmitting force to a force counterbalancing mechanism, means engaging the adjacent end of the bellows for maintaining the end of the bellows when deflected in parallelism with its non-deflected position, said diaphragm serving to stretch the bellows according to the hydraulic pressure and thereby transmit additional force to the force counterbalancing mechanism.

LAWRENCE S. WILLIAMS.

REFERENCES CITED

The following references are of record in the file of this patent:

UNITED STATES PATENTS

| Number | Name | Date |
|---|---|---|
| 1,585,732 | Otto | May 25, 1926 |
| 2,334,242 | Bohannan | Nov. 16, 1943 |